US012655867B2

(12) United States Patent　　　　　　(10) Patent No.: US 12,655,867 B2
Merritt et al.　　　　　　　　　　　　 (45) Date of Patent: Jun. 16, 2026

(54) THERMALLY ADAPTIVE TOP FOIL OF A GAS FOIL BEARING

(71) Applicant: Hamilton Sundstrand Corporation, Charlotte, NC (US)

(72) Inventors: Brent J. Merritt, Southwick, MA (US); Viktor Kilchyk, Lancaster, NY (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 99 days.

(21) Appl. No.: 18/590,374

(22) Filed: Feb. 28, 2024

(65) Prior Publication Data

US 2025/0271027 A1　　Aug. 28, 2025

(51) Int. Cl.
　*F16C 17/02*　　　(2006.01)
　*F16C 33/12*　　　(2006.01)
(52) U.S. Cl.
　CPC .......... *F16C 17/024* (2013.01); *F16C 33/122* (2013.01); *F16C 2202/22* (2013.01)
(58) Field of Classification Search
　CPC ..................................................... F16C 17/024
　See application file for complete search history.

(56) References Cited

U.S. PATENT DOCUMENTS 6,450,688 B2 * 9/2002 Matsushima ......... F16C 17/024
　　　　　　　　　　　　　　　　　　 384/114

FOREIGN PATENT DOCUMENTS

| CN | 110836221 | A | 2/2020 | |
|----|-----------|---|--------|--|
| CN | 110864041 | A | 3/2020 | |
| EP | 2949952 | A1 | 12/2015 | |
| JP | 2002295467 | A | 10/2002 | |
| JP | 2017180684 | A | 10/2017 | |
| WO | WO-2017022795 | A1 * | 2/2017 | ........... F16C 17/024 |
| WO | 2022181509 | A1 | 9/2022 | |
| WO | 2023162018 | A1 | 8/2023 | |

OTHER PUBLICATIONS

Translation of WO2017022795 obtained Sep. 3, 2025.*
Lim, Teik-Cheng "Metamaterial with sign-toggling thermal expansivity inspired by Islamic motifs in Spain", Journal of Science: Advanced Materials and Devices, vol. 7, No. 1, Mar. 2022, pp. 1-6.
Martowicz et al., "Gas Foil Bearing Technology Enhanced with Smart Materials", Applied Sciences, 2021, pp. 1-14.
Schmiedeke et al., "Experimental Investigation of Two Switching States of an Active Foil Bearing During Start-up", Machines 10.6, 2022, pp. 1-18.
Extended European Search Report for EP Application No. 25159769. 6, dated Jul. 29, 2025, pp. 1-10.

* cited by examiner

*Primary Examiner* — James Pilkington
(74) *Attorney, Agent, or Firm* — CANTOR COLBURN LLP

(57)　　　　　　ABSTRACT

A component of a gas foil bearing, having: a plurality of material layers forming a composition gradient that defines a first coefficient of thermal expansion (CTE) and a second CTE that differs from the first CTE, wherein: the plurality of material layers include at least two dissimilar metals, plastics, or fiber filled metals or plastics, that are layered on top of each other; when the component is subject to heating, the component changes from a first shape to a second shape; and the component is a top foil.

8 Claims, 2 Drawing Sheets

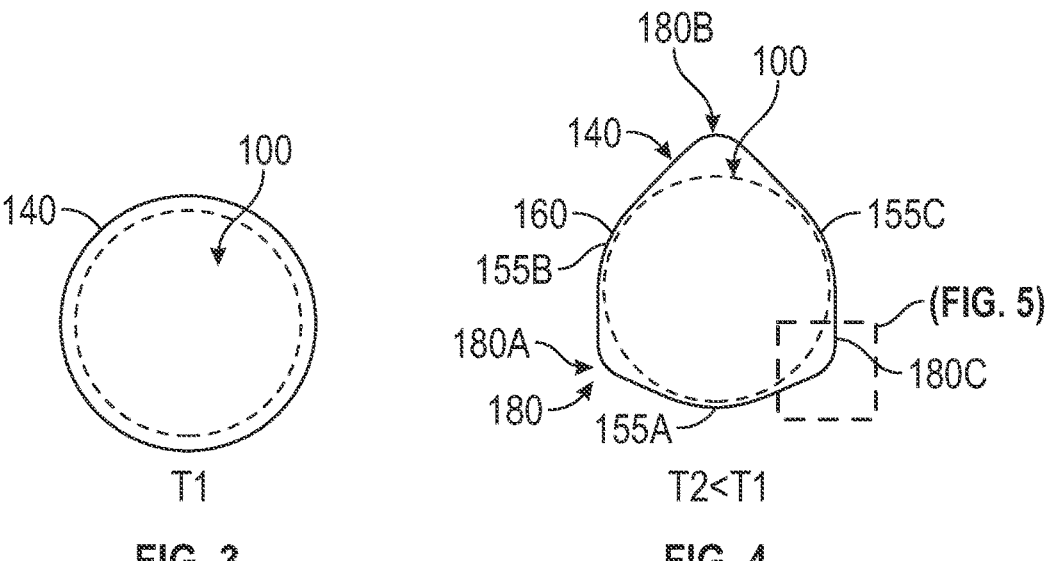
FIG. 3
FIG. 4
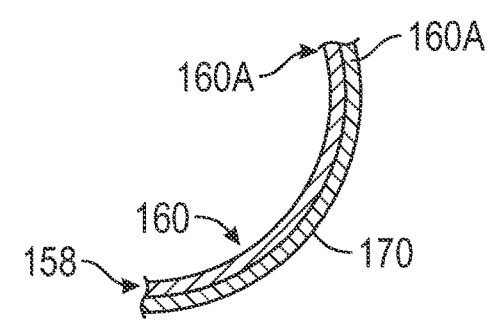
FIG. 5
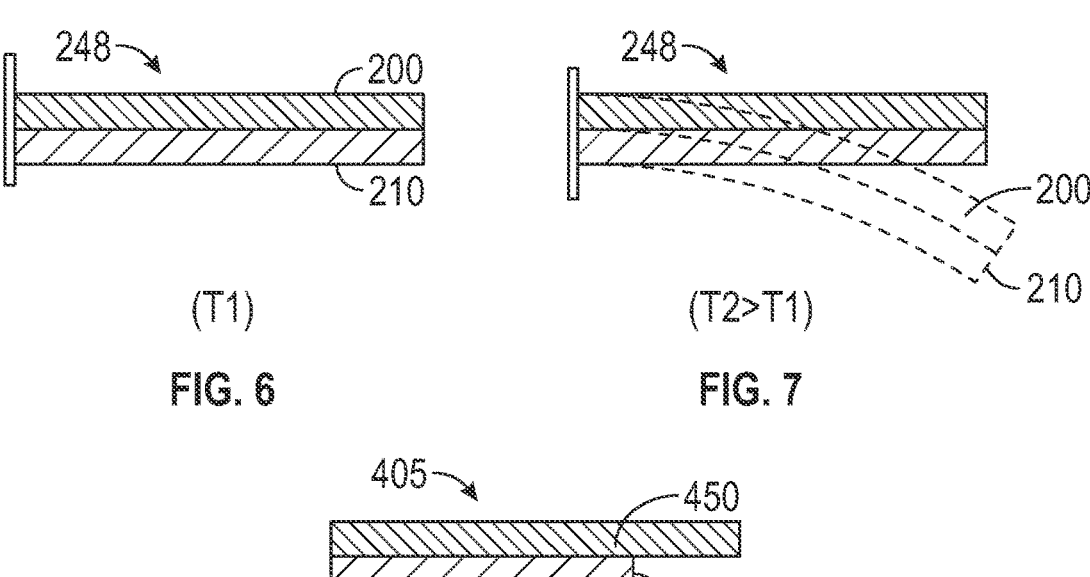
FIG. 6
FIG. 7
FIG. 8

THERMALLY ADAPTIVE TOP FOIL OF A GAS FOIL BEARING

BACKGROUND

The embodiments are directed to gas foil bearings and more specifically to a thermally adaptive top foil of a gas foil bearing.

Thermal stability may impact the effectiveness of a gas foil bearing (GFB) that supports an air cooled and air film supported rotating shaft. A GFB may operate continuously at high ambient temperatures. During normal operation, i.e., under nominal loads, an air film between the GFB and the shaft allows for both hydrodynamic pressure generation and heat flow in the bearing. The heat flow provides the desired level of temperature homogenization within the bearing body. A maximum value of a temperature gradient in the GFB is typically found in the region of a mechanical load transfer, due to the raised shear forces in the air film supporting the rotating shaft. If the bearing is overloaded, or during low rotational speed, the bearing clearance with the shaft may become thin which may result in a raised temperature gradient. The excessive gradients may lead to an uneven thermal expansion of the bearing structural components. Such thermally induced deformation and warping of the GFB geometry may also result in thermal stability loss, i.e., a blocking of internal bearing channels for airflow, or the shaft becoming stuck in the GFB outer shaft or bushing.

BRIEF DESCRIPTION

Disclosed is a component of a gas foil bearing, including: a plurality of material layers forming a composition gradient that defines a first coefficient of thermal expansion (CTE) and a second CTE that differs from the first CTE, wherein: the plurality of material layers include at least two dissimilar metals, plastics, or fiber filled metals or plastics, that are layered on top of each other; when the component is subject to heating, the component changes from a first shape to a second shape; and the component is a top foil.

In addition to one or more aspects of the component or as an alternate, the first shape is a curved triangle.

In addition to one or more aspects of the component or as an alternate, the second shape is circular.

In addition to one or more aspects of the component or as an alternate, the plurality of layers include: a first layer that forms a body of the component; and a second layer that has a same size and shape as the first layer and extends about an exterior side or an interior side of the first layer.

In addition to one or more aspects of the component or as an alternate, the plurality of layers include: a first layer forms a body of the component; and a second layer extends about a portion of an exterior side or an interior side of the first layer.

In addition to one or more aspects of the component or as an alternate: when the component forms the curved triangle, portions of the first layer define corners of the curved triangle; and the second layer forms discrete segments that are located at the corners of the curved triangle.

In addition to one or more aspects of the component or as an alternate, the second layer has a thickness of 10 microns or less.

In addition to one or more aspects of the component or as an alternate, the second layer has a thickness of 10 microns or less.

Further disclosed is a gas foil bearing, including: a component having one or more aspects disclosed herein; a bump foil surrounding the component; and bearing sleeve surrounding the bump foil. In addition to one or more aspects of the gas foil bearing or as an alternate, the bearing further includes: a journal shaft surrounded by the component and supported by the bearing.

BRIEF DESCRIPTION OF THE DRAWINGS

The following descriptions should not be considered limiting in any way. With reference to the accompanying drawings, like elements are numbered alike:

FIG. 3 shows a top foil of the GFB in one shape state, when the GFB is relatively warm;

FIG. 4 shows the top foil in a second shape state, when the GFB is relatively cold;

FIG. 5 shows a detail of the top foil, utilizing material layers having different coefficients of thermal expansion (CTEs) that result in the predetermined shape states;

FIG. 6 shows an element that is equivalent to the top foil configurations disclosed herein, with two material layers having different CTEs, at a temperature T1;

FIG. 7 shows the structure of FIG. 56 at a temperature T2>T1; and

FIG. 8 shows an element similar to that of FIG. 6 at a temperature T2>T1, where a material interface allows free slip between layers, such the layers extend at different rates upon being heated.

DETAILED DESCRIPTION

A detailed description of one or more embodiments of the disclosed apparatus and method are presented herein by way of exemplification and not limitation with reference to the Figures.

Figure 1:
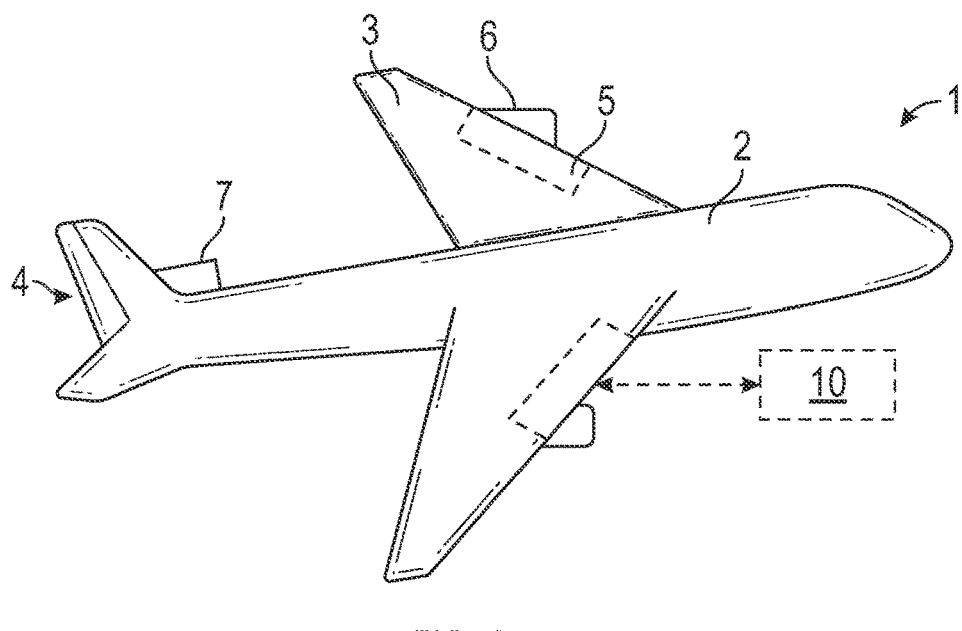
FIG. 1 shows an aircraft according to an embodiment.

FIG. 1 shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. The aircraft 1 may have an air cycle machine 10.

Figure 2:
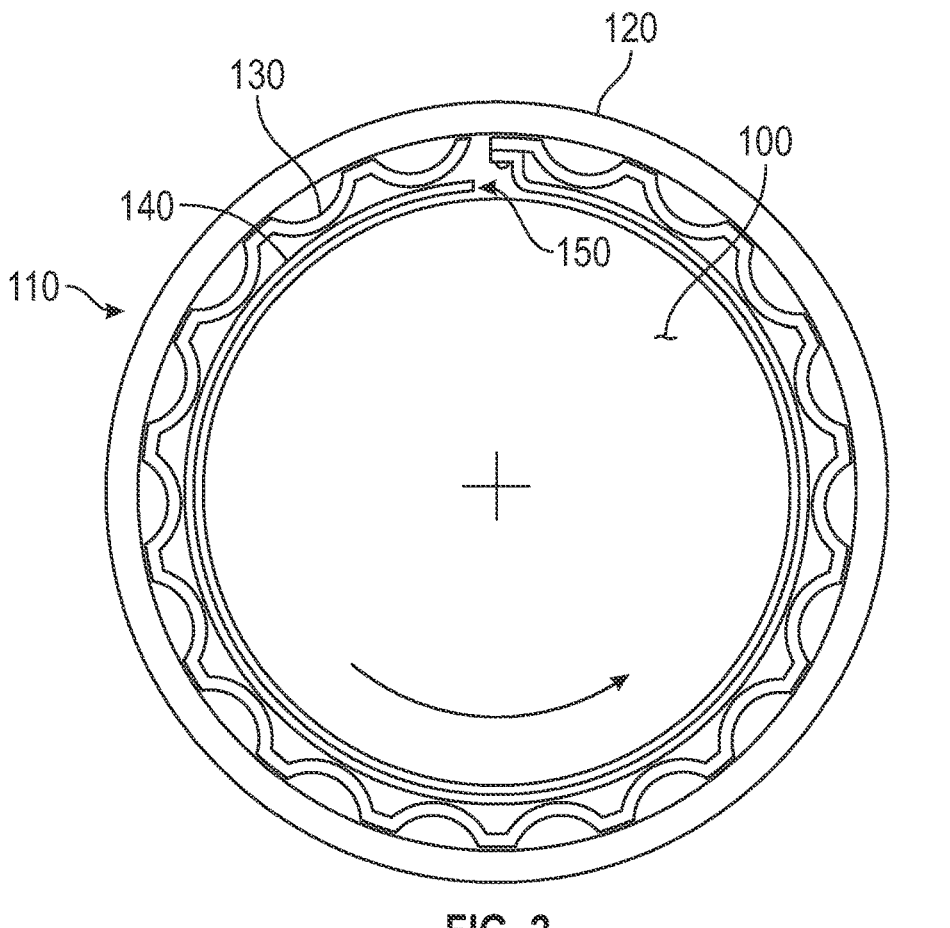
FIG. 2 shows a gas foil bearing (GFB) that may be utilized in the aircraft, according to an embodiment.

Turning to FIG. 2, rotating parts such as a journal shaft (or shaft) 100 may rotate within a gas foil bearing (GFB) 110. The GFB 110 includes a bearing sleeve 120 or shell, or bushing, that may be cylindrical. The bearing sleeve 120 may surround a bump foil 130, which may be ring shaped with an undulating profile. The bump foil 130 may surround a top foil 140, which also may be ring shaped and have a cylindrical profile. A predetermined gap 150 may be defined between the top foil 140 and the shaft 100, which may be separated by a layer of air film during rotation of the shaft 100.

FIG. 3 schematically shows the shape of the top foil 140, as a closed loop for simplicity, at a first temperature T1. FIG. 4 shows the shape of the top foil 140 at a second temperature T2<T1. That is, in a relatively cold state of the GFB 110, the top foil 140 has a curved triangular shape so that there are at least three points of contact 155A, 150B 155C between the GFB 110 and the internal shaft 100 (e.g., a first shape state). When the temperature of the GFB 110 is elevated, e.g., during steady-state operation, the shape of the top foil 140 is round (e.g., a second shape state).

To obtain the shape changes shown in FIGS. 3 and 4, as shown in FIG. 5, the top foil 140 may be additively manufactured with a plurality of dissimilar materials, including dissimilar metals or thermoplastic polymers which may be filled with dissimilar fibers. Where two or more metals are utilized in the disclosed embodiments, the metals may include ones that form memory alloys in the regions of mixed composition. Alternatively, a memory alloy may be utilized to manufacture the foil 140. With the materials, the top foil 140 forms a composition gradient that defines a first coefficient of thermal expansion (CTE) and a second CTE that differs from the first CTE. With the composition gradient, the different shapes shown in FIGS. 3 and 4 may be obtained at different operating temperatures of the GFB 110.

More specifically the top foil 140 has a first layer 158 of a material forming a body 160 of the top foil 140. The first layer 158 may have a first coefficient of thermal expansion (CTE). By utilizing additive manufacturing, a second layer 170 of a second material may be provided around a portion the body 160 or the entire body 160 of the top foil 140, i.e., having a same size and shape as the first layer 158. The second layer 170 may be 10 microns thick. The second material may be a different material than the first material, having a second CTE that differs from the first CTE to form a CTE gradient.

In one embodiment, the second layer is distributed only at predetermined locations 180, such as three portions 180A, 180B, 180C of the first layer 158, which are circumferentially distributed around the body 160 of the top foil 140. These locations 180A, 180B, 180C form corners of the curved triangular shape shown in FIG. 4. In one embodiment the second layer 170 is formed on an exterior side 160A of the bearing sleeve body 160, though the second layer 170 may be formed on an interior side 160B of the bearing sleeve body 160.

FIGS. 6 and 7 show a structural element 248 that is equivalent to the layers shown in FIG. 6. Specifically, first and second layers 200, 210, which may be dissimilar metals, thermoplastic polymers, and which may be filled with dissimilar fibers, to provide dissimilar CTEs. The layers 200, 210 are at a temperature T1 in FIG. 6, and T2 that is greater than T1 in FIG. 7. The controlled thermal expansion shown in FIG. 7 results from the layers 200, 210 being integrally connected. That is, the first and second layer 200, 210 bend together in a predictable and controlled way. That is, the controlled thermal expansion of the first and second layers 200, 210 provides the desired shape change of the structural element 248. FIG. 8 shows an element 405 that is similar to that of FIG. 7 at a temperature T2>T1, where a material interface allows free slip between layers 450, 460, such the layers 450, 460 extend at different rates upon being heated, rather than deforming as shown in FIG. 6.

Benefits of a top foil 140 that deforms as shown in FIGS. 3 and 4 include a reduction of non-uniform or undesired deformation that may otherwise occur with temperature gradients that are induced throughout the operation of the GFB 110. That is, the embodiments provide a GFB 110 that has an optimized stiffness over substantially an entire range of operation of the GFB 110. The GPF 110 that deforms as shown in FIGS. 3-4 may increase the bearing capacity, reduce startup drag, increase durability, and provide improved modal stability. In addition, the embodiments may reduce startup drag and wear.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A component of a gas foil bearing, comprising:
   a plurality of material layers forming a composition gradient that defines a first coefficient of thermal expansion (CTE) and a second CTE that differs from the first CTE,
   wherein:
   the plurality of material layers include at least two metals, plastics, or fiber filled metals or plastics, that are layered on top of each other, such that the layers define the first and second CTEs;
   when the component is subject to heating, the component changes from a first shape to a second shape; and
   the component is a top foil,
   wherein the first shape is a curved triangle, and the second shape is circular.

2. The component of claim 1, wherein
   the plurality of layers include:
   a first layer that forms a body of the component; and
   a second layer that has a same size and shape as the first layer and extends about an exterior side or an interior side of the first layer.

3. The component of claim 2, wherein the second layer has a thickness of 10 microns or less.

4. The component of claim 1, wherein
   the plurality of layers include:
   a first layer that forms a body of the component; and
   a second layer that extends about a portion of an exterior side or an interior side of the first layer.

5. The component of claim 4, wherein:
   when the component forms the curved triangle, portions of the first layer define corners of the curved triangle; and
   the second layer forms discrete segments that are located at the corners of the curved triangle.

6. The component of claim 4, wherein the second layer has a thickness of 10 microns or less.

7. A gas foil bearing, comprising:
   a component of claim 1;
   a bump foil surrounding the component; and
   a bearing sleeve surrounding the bump foil.

8. The bearing of claim 7, further comprising:
   a journal shaft surrounded by the component and supported by the bearing.

* * * * *